(12) United States Patent
Chana et al.

(10) Patent No.: US 11,169,652 B2
(45) Date of Patent: *Nov. 9, 2021

(54) GUI CONFIGURATION

(71) Applicant: International Business Machines Corporation, Armonk, NY (US)

(72) Inventors: Mandeep Chana, Wokingham (GB); Jonathan K. Lawder, London (GB); Christian D. Smith, Nuneaton (GB); Mary J. Li Kam Wa, London (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,456

(22) Filed: Jun. 6, 2018

(65) Prior Publication Data
US 2018/0284951 A1 Oct. 4, 2018

Related U.S. Application Data

(63) Continuation of application No. 14/478,482, filed on Sep. 5, 2014, now Pat. No. 10,078,412.

(30) Foreign Application Priority Data

Sep. 13, 2013 (GB) ..................... 1316320

(51) Int. Cl.
*G06F 3/0481* (2013.01)
*G06F 3/0484* (2013.01)
(Continued)

(52) U.S. Cl.
CPC .......... *G06F 3/0481* (2013.01); *G06F 3/0482* (2013.01); *G06F 3/0484* (2013.01);
(Continued)

(58) Field of Classification Search
CPC ...... G06F 3/0481; G06F 9/451; G06F 3/0484; G06F 3/0482; G06F 9/453; G06F 3/04855

See application file for complete search history.

(56) References Cited

U.S. PATENT DOCUMENTS

| 5,103,498 A | 4/1992 | Lanier et al. |
| 5,581,684 A | 12/1996 | Dudzik et al. |

(Continued)

FOREIGN PATENT DOCUMENTS

| CN | 101652796 A | 2/2010 |
| CN | 202177892 U | 3/2012 |

OTHER PUBLICATIONS

Parent U.S. Appl. No. 14/478,482, Non-final Office Action dated Jun. 16, 2016.
(Continued)

*Primary Examiner* — Roberto Borja
(74) *Attorney, Agent, or Firm* — Law Office of Jim Boice

(57) ABSTRACT

A method, system, and/or computer program product modifies a viewing controller widget. A computer system receives an area defining user input that defines an area of a graphical user interface, where the area defining user input draws a geometric shape on the graphical user interface in order to define the area of the graphical user interface; captures an event management user input within the geometric shape on the graphical user interface; displays an event management viewer on the graphical user interface, where the event management viewer presents past user events that modified features of the viewing controller widget; receives a user selection of a previous event from the event management viewer; and modifies one or more features of the viewing controller widget based on the user selection of the previous event from the event management viewer.

20 Claims, 5 Drawing Sheets

(51) Int. Cl.
*G06F 3/0482* (2013.01)
*G06F 9/451* (2018.01)
*G06F 3/0485* (2013.01)

(52) U.S. Cl.
CPC .......... *G06F 3/04855* (2013.01); *G06F 9/451* (2018.02); *G06F 9/453* (2018.02)

(56) References Cited

U.S. PATENT DOCUMENTS

| | | | |
|---|---|---|---|
| 5,771,032 A * | 6/1998 | Cline | G06F 3/0485 345/622 |
| 6,452,607 B1 | 9/2002 | Livingston | |
| 7,051,029 B1 | 5/2006 | Fayyad | |
| 7,818,419 B1 | 10/2010 | McAllister | |
| 7,882,090 B2 | 2/2011 | Richardson et al. | |
| 8,099,664 B2 | 1/2012 | Kureshy et al. | |
| 8,151,192 B2 | 4/2012 | Black et al. | |
| 10,134,044 B1 * | 11/2018 | Shoemaker | G06Q 30/0254 |
| 2006/0168170 A1 | 7/2006 | Korzeniowski | |
| 2007/0240057 A1 | 10/2007 | Satterfield et al. | |
| 2010/0042921 A1 | 2/2010 | Chang et al. | |
| 2010/0093316 A1 | 4/2010 | Doppler | |
| 2010/0185905 A1 * | 7/2010 | Brugler | G06F 11/0769 714/57 |
| 2010/0229112 A1 | 9/2010 | Ergan | |
| 2010/0229120 A1 * | 9/2010 | Inoue | G11B 27/105 715/811 |
| 2011/0167361 A1 * | 7/2011 | Watanabe | H04L 63/08 715/760 |
| 2011/0302528 A1 | 12/2011 | Starr | |
| 2011/0314376 A1 | 12/2011 | Dearman et al. | |
| 2012/0272192 A1 | 10/2012 | Grossman | |
| 2013/0326323 A1 * | 12/2013 | Siwoff | G06F 17/2288 715/229 |
| 2014/0089824 A1 | 3/2014 | George | |
| 2014/0149931 A1 | 5/2014 | Miki | |
| 2014/0310653 A1 | 10/2014 | Han | |
| 2015/0212657 A1 | 7/2015 | Schilit | |
| 2017/0010760 A1 * | 1/2017 | Rapport | G06Q 10/10 |

OTHER PUBLICATIONS

Parent U.S. Appl. No. 14/478,482, Final Office Action dated Mar. 1, 2017.
Parent U.S. Appl. No. 14/478,482, Non-final Office Action dated Sep. 8, 2017.
Parent U.S. Appl. No. 14/478,482, Interview Summary dated May 16, 2015.
Anonymous, "Method and System for Displaying an Enhanced Help User Interface", IP.com, Mar. 10, 2013, pp. 1-6.
IBM, "Automatic Help Page Generation Based on Actual UI Components in Calling Page Interface", IP.com, Aug. 2, 2007, pp. 1-3.
List of IBM Patents or Patent Applications Treated as Related, Jun. 6, 2018.

* cited by examiner

GUI CONFIGURATION

BACKGROUND

This invention relates to a method of operating a computer system and to the computing system itself.

Almost all modern computing systems use graphical user interfaces (GUIs) as the main interface for a user to interact with the applications being run by the computing system. Desktop computers and handheld computing devices such as smartphones and tablet computers all use GUIs. In the case of a desktop computer, a user will interact with the GUI via a keyboard and mouse, using an on-screen cursor, for example. In the case of modern smartphones and tablet computers, a user will interact with the GUI via a touchscreen, for example using their finger(s) or a stylus. The GUI will be configured to behave in certain ways in specific circumstances, which are not always preferable for all users. For example features such as scrolling, selection of menus and shortcuts are often configured in different ways on different devices/applications, which can leave a user in difficulties when using a GUI with which they are unfamiliar.

Most GUIs have an associated help system which describes the configuration steps and options of the GUI. To access a help system a user is required to invoke the help system via a menu or key stroke. The problem for the user then becomes navigating to the correct description in the help system. This usually requires searching the whole help database to find the correct configuration steps. For example, a user may need to frame a query such as: "how do I stop the meeting reminder appearing 10 minutes before the meeting?". Another difficult task for a user to perform is to determine the specific configuration options for a particular part of a GUI. So, for example, the GUI user may want to know "what are the configuration options for changing the behavior of the scroll bar in the web browser?" Many users find the navigation of an entire help system difficult and frustrating to use, when attempting to locate GUI configuration information.

SUMMARY

A method, system, and/or computer program product modifies a viewing controller widget. A computer system receives an area defining user input that defines an area of a graphical user interface, where the area defining user input draws a geometric shape on the graphical user interface in order to define the area of the graphical user interface. In response to the geometric shape defining the area of the graphical user interface, the computer system captures an event management user input within the geometric shape on the graphical user interface. In response to capturing the event management user input, the computer system displays an event management viewer on the graphical user interface, where the event management viewer presents past user events that modified features of the viewing controller widget. The computer system receives a user selection of a previous event from the event management viewer, and in response to receiving the user selection of the previous event from the event management viewer, modifies one or more features of the viewing controller widget based on the user selection of the previous event from the event management viewer.

BRIEF DESCRIPTION OF THE DRAWINGS

Preferred embodiments of the present invention will now be described, by way of example only, with reference to the following drawings, in which.

DETAILED DESCRIPTION

Figure 1:
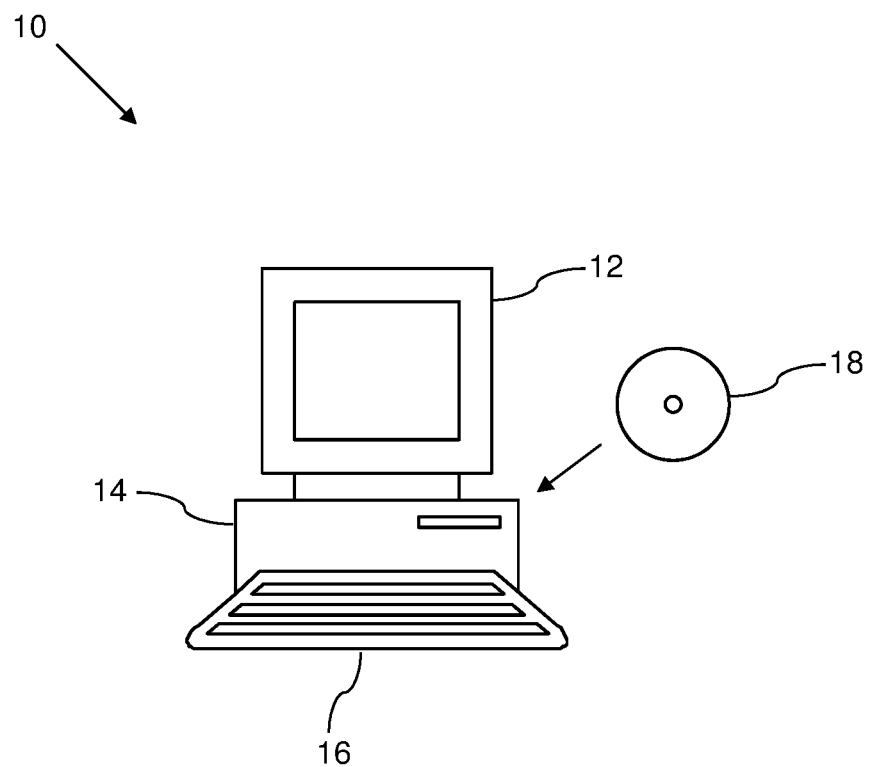
FIG. 1 is a schematic diagram of a computing system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a computing system 10, which comprises a display device 12, a processor 14 and a user interface 16. The processor 14 is connected to the display device 12 and the user interface 16. The user interface 16 is a keyboard and additional user interface devices may also be provided, such as a mouse, which is also connected to the processor 14. The processor 14 controls the operation of the computing system 10, receiving user inputs from the user interface 16 and controlling the output of the display device 12. A computer program product on a computer readable medium 18, such as a CD-ROM, can be used to operate the processor 14.

The computing system 10 shown in FIG. 1 is a conventional desktop computer that a user can utilize for standard desktop applications such as word processing, spreadsheets, Internet browsing, email and so forth. The processor 14 will run an operating system that provides the base for supporting one or more applications that provide the functions that the user needs. The operating system and all of the applications provide their interaction with the user through a graphical user interface that is shown on the display device 12. The processor 14, through the operating system, displays the graphical user interface on the display device 12, with which the user can interact.

Most graphical user interfaces on desktop computers employ similar well-known techniques for basic interactions, such as launching applications. Usually a cursor is displayed within the graphical user interface that a user can move around with the mouse and access to applications can be provided via on-screen icons that can be double-clicked using a mouse button to launch and/or a start menu is provided where the user can either click on application names or type in the name of an application that they wish to launch. Icons and menus are usually handled in standard ways across different graphical user interfaces on desktop computers, as users are very familiar with long-standing standardized techniques.

Figure 2:
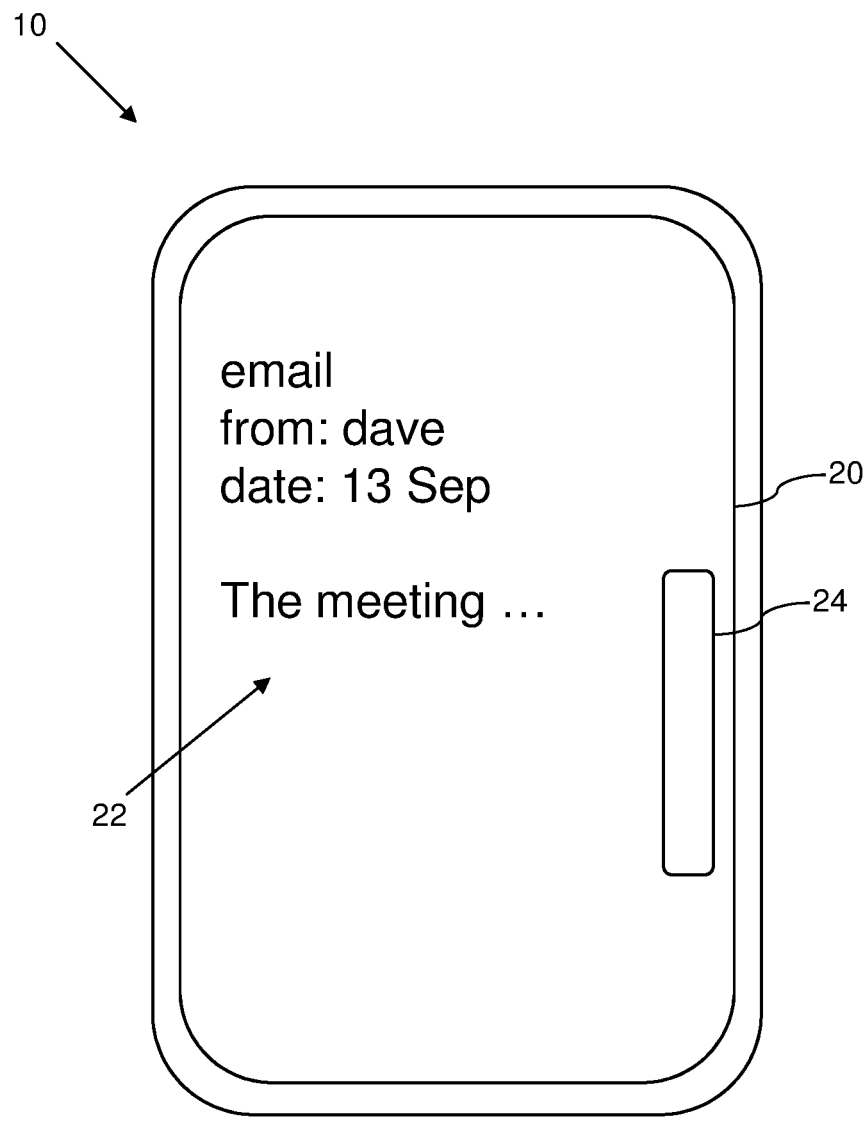
FIG. 2 is a schematic diagram of a different computing system.

FIG. 2 shows an example of a different type of computing system 10, which is a smartphone that has the main function of providing wireless telephony, but also has a significant computing capability that can be used for standard applications usually associated with a desktop computer, such as email and Internet browsing. The smartphone 10 is provided with a touchscreen 20, which combines the functions of user interface and the display device. The user can interact with the smartphone 10 by touching the touchscreen 20 with their finger. The touchscreen 20 of the smartphone 10 detects the location of any touch by the user on the touchscreen 20 and interprets that touch accordingly.

The touchscreen 20 is displaying a graphical user interface 22, which in FIG. 2 is showing an email application that the user is currently accessing. A user interface element 24 is also shown in the Figure, which is a scrollbar that forms part of the display of the email application currently being shown. Scroll bars are well-known user interface elements which indicate that additional material is present that cannot be shown owing to size constraints. The user can interact with the scroll bar 24 in order to access the additional material. The user is able to touch the scroll bar 24 with their finger and move the scroll bar 24 up and down.

Every application that is run by a computing system 10 through a graphical user interface 22 will have numerous different user interface elements, some of which are obvious and shown on a regular basis and some of which only occur in specific situations that happen only rarely. For example, the email application being run by the smartphone 10 may have an alert feature that indicates that a new email has been received. A small on-screen alert may be shown each time an email is received. However, this user interface element may be annoying for the user, who may wish to turn off the feature. This requires accessing user interface configuration options.

Figure 3:
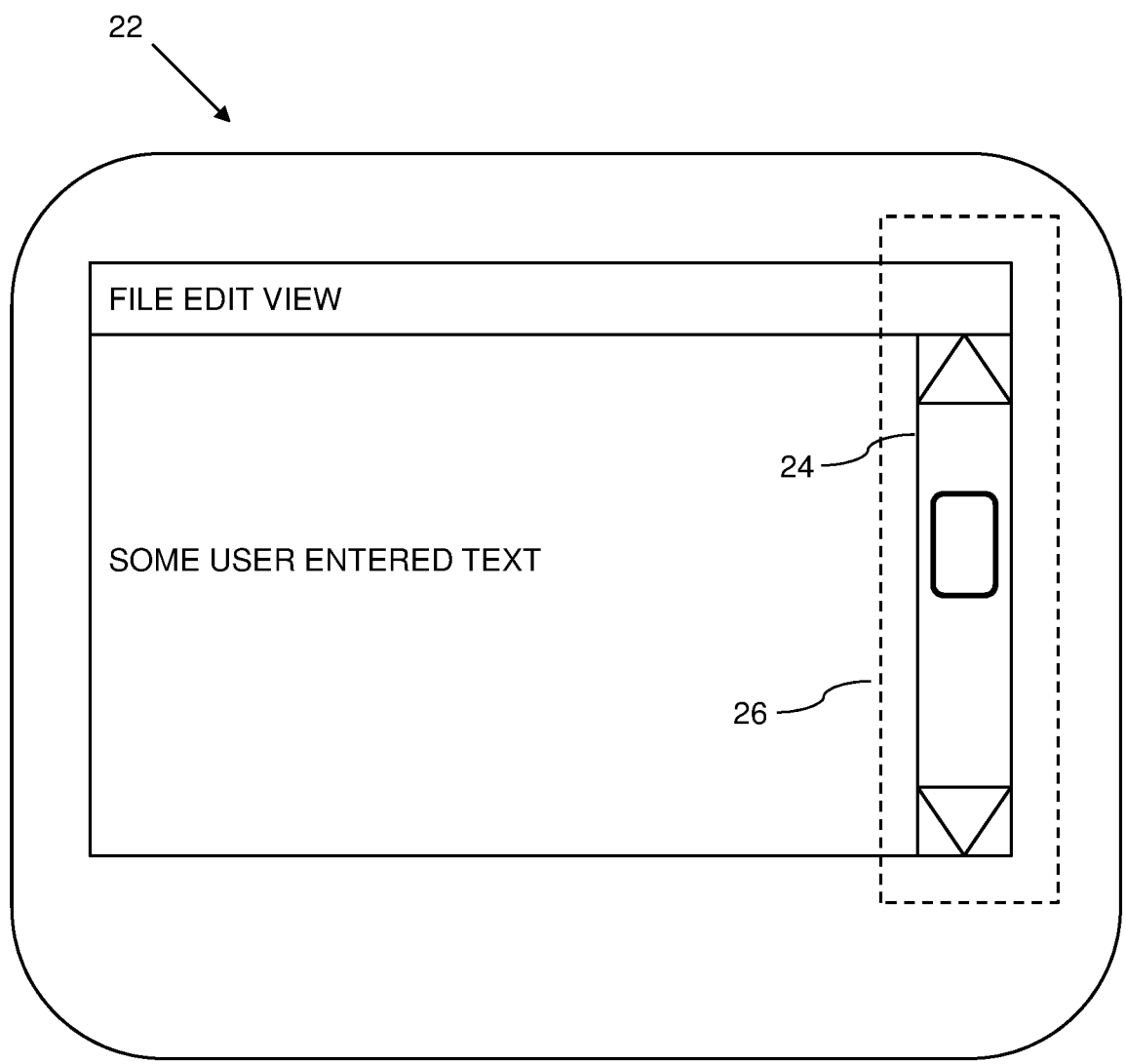
FIGS. 3 and 4 are schematic diagrams of a graphical user interface.

FIG. 3 shows how a user can interact with the user interface to discover the user interface configuration options. The user defines an area 26 over the graphical user interface 22 for which an event management system will capture events. The area 26 can be considered as an area of interest to the user and is in the form of a rectangle, although other shapes such as a circle could also be used. It is assumed that the user has turned on an event capture before defining the area 26 or this can occur automatically. The specification of the area 26 will trigger the capturing of user interface events until such time as the event capturing has been toggled off. FIG. 3 illustrates the specification of the area 26 over the scroll bar 24 using a dashed line.

The user then carries on executing operations in the graphical user interface 22. One of them may involve the user moving their fingers on the area around the scroll bar 24, which in the case of a touchscreen, is the point when the scroll bar 24 automatically appears. This will generate an event, which is stored in a log that is maintained by the event management system. The user can carry on using the smartphone 10 as normal, interacting with the device as if nothing has changed. However, whenever a graphical user interface action occurs in the defined area 26, then this results in an event being stored in the log.

The generation of the events can either be driven by the application itself, in the sense that the application will generate specific events that are authored within the application, in response to user interface actions, or the event management system generates the events by monitoring the changes in the graphical user interface 22. In the latter case, the application being run is unaware that the event generation is taking place in the background. Events do not have to be generated for every single user interface action; this will depend on the specifics of the event generation system, which may decide that certain user interface actions do not need to be captured.

Figure 4:
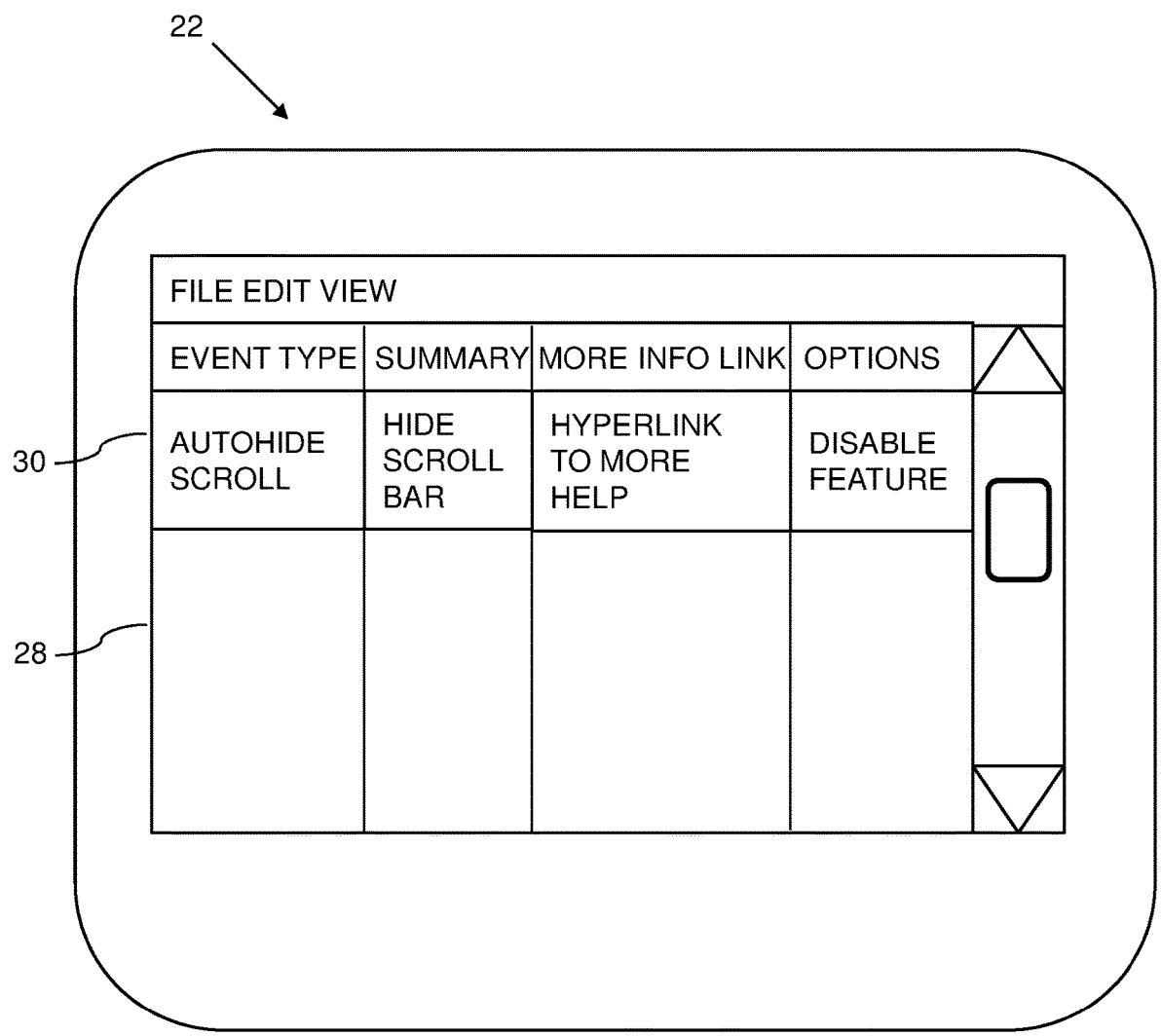

If the user wishes to make any graphical user interface configuration changes, then they can launch an event management viewer. FIG. 4 illustrates such an event management viewer, which is accessed by the user performing a predefined user input and an event log 28 is displayed in response to the predefined user input. An event 30 is shown in the event log 28, which is describing the auto-hiding of the scroll bar 24. There is also a one click "Disable Feature" button within the event 30 that can switch the auto-hiding of the scroll bar 24. In this way, the user can access events relating to the defined area 26 that they previously created.

More events could be generated other than the one shown in the log 28. For example, the log 28 can allow the user to customize colour settings of the user interface elements such as the scroll bar 24 at a fine level, by listing color settings of the elements within the area 26 as events. It is possible for the user to discover any further features available within the area 26 by clicking on a "discover" function within the log 28. This allows the user to target at a finer granular level the help in which they are interested. The user is therefore able to access detailed user interface configuration information without having to navigate a help system.

The event logging is occurring in the background for as long as the user wishes to have the feature switched on. This could mean that a very large number of events occur and are stored in the log 28. For this reason it is preferable for the log 28 to perform a de-duplication, whereby any duplicate entries within the log 28 are deleted, prior to the log 28 being displayed to the user. Multiple different events 30 are then displayed to the user in an ordered list. The ordering could be based on most recent first or could be based on the number of times that the event 30 was generated, prior to de-duplication.

Figure 5:
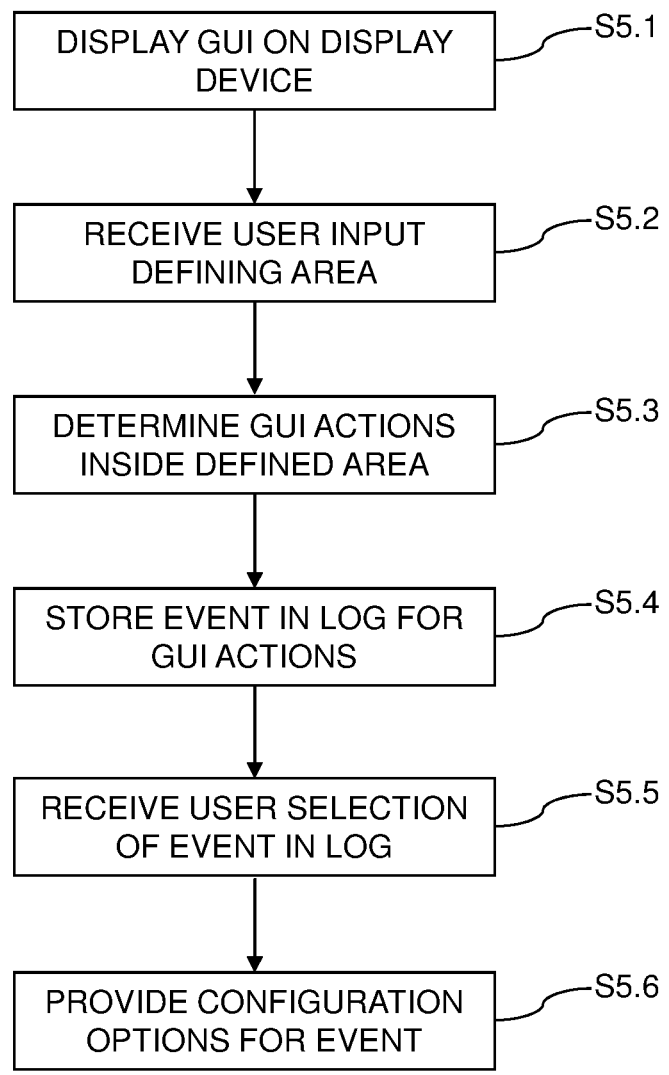
FIG. 5 is a flowchart of a method of operating a computer system.

FIG. 5 is a flowchart summarizing the method of operating the computer system 10, which comprises a display device 12, a user interface 16 and a processor 14 connected to the display device 12 and the user interface 16. The method comprises the steps of, firstly step S5.1, which comprises displaying a graphical user interface 22 on the display device 10. The second step, S5.2 comprises receiving a user input defining an area 26 of the graphical user interface 22. The area 26 is preferably a rectangle, which the user can draw by creating opposite corners of the rectangle using the on-screen cursor or using their finger on a touchscreen device.

The next step of the method is step S5.3, which comprises determining a graphical user interface action in the defined area of the graphical user interface. This user interface action could be an action that has already taken place and is being shown currently in the graphical user interface 22 (such as a pop-up menu) or could be an action that will take place after the user has defined the area of interest. In response to the action, the next step in the method comprises step S5.4, storing an event 30 in the log 28, the event 30 generated as a result of the determined graphical user interface action. All events 30 generated are stored in the log 28, until de-duplication takes place.

The fifth step in the method is step S5.5, which comprises receiving a user selection of an event 30 stored in the event log 28, and the final step of the method is step S5.6, which comprises providing configuration options for the user selected event 30. In this way, the user is able to access events 30 that have been generated as a result of user interface actions. The user will be able to see the configuration options for the specific events 30 that are stored within the log 28 and can make changes within the log 28 to the configuration of the specific user interface action that concern them.

According to a first aspect of the present invention, there is provided a method of operating a computer system comprising a display device, a user interface and a processor connected to the display device and the user interface, the method comprising the steps of displaying a graphical user interface on the display device, receiving a user input defining an area of the graphical user interface, determining a graphical user interface action in the defined area of the graphical user interface, storing an event in a log, the event generated as a result of the determined graphical user interface action, receiving a user selection of an event stored in the event log, and providing configuration options for the user selected event.

According to a second aspect of the present invention, there is provided a computer system comprising a display device, a user interface and a processor connected to the display device and the user interface, the computer system arranged to display a graphical user interface on the display device, receive a user input defining an area of the graphical user interface, determine a graphical user interface action in the defined area of the graphical user interface, store an event in a log, the event generated as a result of the determined graphical user interface action, receive a user selection of an event stored in the event log, and provide configuration options for the user selected event.

According to a third aspect of the present invention, there is provided a computer program product on a computer readable medium for operating a computer system comprising a display device, a user interface and a processor connected to the display device and the user interface, the product comprising instructions for displaying a graphical user interface on the display device, receiving a user input defining an area of the graphical user interface, determining a graphical user interface action in the defined area of the graphical user interface, storing an event in a log, the event generated as a result of the determined graphical user interface action, receiving a user selection of an event stored in the event log, and providing configuration options for the user selected event.

Owing to the invention, it is possible to speed up the process of determining which part of a help system is concerned with configuring the GUI behavior of interest, as specified by the end user. In a preferred embodiment, the user first enables a GUI event manager, for example, via an operating system control panel. A GUI event manager is responsible for capturing GUI based events such as "hide scroll bar" or "show tool tip". Once that has been done, it is then possible for the user, in a preferred embodiment, to draw a rectangle over an area of the GUI of interest. This rectangle can be specified via the mouse or using a touch-screen.

At this point, the user is able to perform a number of operations over the area covered by the aforementioned rectangle. For example, the user is able to find out what configuration options are available for the area covered by the rectangle. So if the user drew a rectangle around the scroll bar, it is possible to find out which configuration options are available for the scroll bar. This gives targeted help as opposed to just providing a blanket help. In the case of the scroll bar, a user can determine the options for configuring the look and feel of the scroll bar and/or how to disable the scroll bar. This can be extended to scenarios such as "how do I disable the meeting reminder appearing?" by drawing a rectangle over the meeting reminder and seeing the configuration options that are available.

The computing system will also capture events pertaining to the area covered by the user's rectangle. It is therefore possible for a user to draw a rectangle over a portion of a touchscreen, for example representing a part of a mobile phone display. Then any GUI events that occur over that portion of the touchscreen are sent to the GUI event manager. The events can be viewed in the GUI event manager console. It is possible to carry out operations based on these events, such as disabling the configuration that led to the event being generated, using a single click and hence disabling the GUI behavior responsible for the event. This is useful in a mobile device where the screen real estate is small and trawling through the help is particularly difficult.

The improved system allows the GUI help to be targeted to a specific part of the screen which can be defined by the user and not the underlying GUI process. This helps usability and allows finer grained configuration. The system supports the capture of GUI events for which it may be hard to define a search within the help pages. So it solves the problem for the user of "I can see what the GUI is doing, but do not know how to specify that to the help subsystem in terms of text". In a preferred embodiment, all GUI events will be de-duplicated hence preventing event overload within the event manager event console.

In a preferred embodiment of the invention, a GUI event manager is installed that has access to the operating system GUI functions. This has the capability of receiving events pertaining to any point on the screen. The GUI is then able to send events to the event manager. The event manager receives these events and is able to determine from the event where the event came from, in terms of screen location. This is then used to determine if that location falls into the area covered by the user-defined rectangle and hence controlling what is displayed to the user in terms of events. Further to this, the GUI components through the operating system GUI functions can determine their locations. This allows these components to determine if they should broadcast their configuration capabilities to the event manager system in the case of the user requesting what those capabilities are for a predefined drawn rectangle.

A computer system comprises a display device, a user interface and a processor connected to the display device and the user interface. a method of operating the computer system comprises the steps of displaying a graphical user interface on the display device, receiving a user input defining an area of the graphical user interface, determining a graphical user interface action in the defined area of the graphical user interface, storing an event in a log, the event generated as a result of the determined graphical user interface action, receiving a user selection of an event stored in the event log, and providing configuration options for the user selected event.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving, by one or more processors, an area defining user input that defines an area of a graphical user interface, wherein the area defining user input draws a geometric shape on the graphical user interface in order to define the area of the graphical user interface as a defined area;

determining, by one or more processors, a graphical user interface action that is performed by a user in the defined area of the graphical user interface, wherein the graphical user interface action involves use of a viewing controller widget on a display device;

storing, by one or more processors, an event in an event log, wherein the event is generated in response to said determining the graphical user interface action that is performed by the user, wherein the event describes the graphical user interface action that is performed by the user, and wherein the event modifies the viewing controller widget;

receiving, by one or more processors, a predefined user input for displaying an event management viewer, wherein the event management viewer presents past user events that modified features of the viewing controller widget;

in response to receiving the predefined user input, displaying, by one or more processors, the event management viewer on the graphical user interface;

receiving, by one or more processors, a user selection of a previous event from the event management viewer, wherein the previous event is stored in the event log, wherein executing the user selection of the previous event provides a summary of a feature of the viewing controller widget, a hyperlink to help information regarding modifying the feature of the viewing controller widget, and an option to disable the feature of the viewing controller widget by using a single click, wherein the previous event stored in the event log previously modified the feature of the viewing controller widget, and wherein the previous event was generated as a result of one or more user interface actions with the graphical user interface; and in response to receiving the user selection of the previous event from the event management viewer, modifying, by one or more processors, one or more features of the viewing controller widget based on the user selection of the previous event from the event management viewer.

2. The method according to claim 1, further comprising:
deleting, by one or more processors, duplicate entries in the event management viewer.

3. The method according to claim 1, wherein the viewing controller widget is a scroll bar, and said modifying the one or more features of the viewing controller widget hides the scroll bar from being displayed on the graphical user interface.

4. The method according to claim 1, further comprising:
receiving, by one or more processors, an event notification from an application operating in the defined area of the graphical user interface as the predefined user input.

5. The method according to claim 1, further comprising:
determining, by one or more processors, a graphical user interface action that occurred in the defined area prior to said receiving the area defining user input.

6. The method of claim 1, further comprising:
ordering, by one or more processors, events in the event management viewer according to frequency, wherein a most frequently received event for storage in an event log is displayed at a top of the event management viewer.

7. The method of claim 1, wherein said modifying the one or more features of the viewing controller widget changes color settings of elements within the defined area of the graphical user interface.

8. The method of claim 1, further comprising:
presenting, by one or more processors, specific configuration options that are available for the defined area of the graphical user interface that is identified by the user selection of the previous event from the event management viewer.

9. The method of claim 1, wherein the past user events that modified the one or more features of the viewing controller widget, the user selection of the previous event from the event management viewer, and the predefined user input are all performed by a same user.

10. The method of claim 1, further comprising:
providing, by one or more processors, configuration options for a user selected event from the event management viewer, wherein the configuration options are presented in the event management viewer as one or more previous events related to the viewing controller widget, and wherein the one or more previous events modify one or more features of the viewing controller widget.

11. The method of claim 1, further comprising:
in response to receiving the area defining user input that defines the area, capturing, by one or more processors, a change to a functional property of a viewing controller widget only within the defined area on the graphical user interface, wherein the viewing controller widget controls which portions of the graphical user interface are displayed.

12. A computer program product for modifying a viewing controller widget, the computer program product comprising a non-transitory computer readable storage medium having program code embodied therewith, the program code readable and executable by a processor to perform a method comprising:

receiving an area defining user input that defines an area of a graphical user interface, wherein the area defining user input draws a geometric shape on the graphical user interface in order to define the area of the graphical user interface as a defined area;

determining a graphical user interface action that is performed by a user in the defined area of the graphical user interface, wherein the graphical user interface action involves use of the viewing controller widget on a display device;

storing an event in an event log, wherein the event is generated in response to said determining the graphical user interface action that is performed by the user, wherein the event describes the graphical user interface action that is performed by the user, and wherein the event modifies the viewing controller widget;

receiving a predefined user input for displaying an event management viewer, wherein the event management viewer presents past user events that modified features of the viewing controller widget; in response to receiving the predefined user input, displaying the event management viewer on the graphical user interface;

receiving a user selection of a previous event from the event management viewer, wherein the previous event is stored in the event log, wherein executing the user selection of the previous event provides a summary of a feature of the viewing controller widget, a hyperlink to help information regarding modifying the feature of the viewing controller widget, and an option to disable the feature of the viewing controller widget by using a single click, wherein the previous event stored in the event log previously modified the feature of the viewing controller widget, and wherein the previous event was generated as a result of one or more user interface actions with the graphical user interface; and in response to receiving the user selection of the previous event from the event management viewer, modifying one or more features of the viewing controller widget based on the user selection of the previous event from the event management viewer.

13. The computer program product of claim 9, wherein the method further comprises:
deleting duplicate entries in the event management viewer.

14. The computer program product of claim 12, wherein the viewing controller widget is a scroll bar, and said modifying the one or more features of the viewing controller widget hides the scroll bar from being displayed on the graphical user interface.

15. The computer program product of claim 12, wherein the method further comprises:

receiving an event notification from an application operating in the defined area of the graphical user interface as the predefined user input.

16. The computer program product of claim 12, wherein the method further comprises:

determining a graphical user interface action that occurred in the defined area prior to said receiving the area defining user input.

17. The computer program product of claim 12, wherein the method further comprises:

ordering events in the event management viewer according to frequency, wherein a most frequently received event for storage in an event log is displayed at a top of the event management viewer.

18. The computer program product of claim 12, wherein said modifying the one or more features of the viewing controller widget changes color settings of elements within the defined area of the graphical user interface.

19. The computer program product of claim 12, wherein the method further comprises: presenting specific configuration options that are available for the defined area of the graphical user interface that is identified by the user selection of the previous event from the event management viewer.

20. A method of operating a computer system comprising a display device that displays a user interface, wherein one or more processors are connected to the display device, and wherein the method comprises:

receiving, by one or more processors, a user input defining an area of a graphical user interface on the display device, wherein the user input draws a geometric shape on the graphical user interface in order to define the area of the graphical user interface;

in response to the geometric shape defining the area of the graphical user interface, capturing, by one or more processors, events within the geometric shape on the graphical user interface that modify a viewing controller widget;

determining, by one or more processors, a graphical user interface action that is performed by a user in the defined area of the graphical user interface, wherein the graphical user interface action involves use of the viewing controller widget on the display device;

storing, by one or more processors, an event in an event log, wherein the event is generated in response to said determining the graphical user interface action that is performed by the user, wherein the event describes the graphical user interface action that is performed by the user, and wherein the event modifies the viewing controller widget;

receiving, by one or more processors, a predefined user input;

in response to receiving the predefined user input, displaying, by one or more processors, an event management viewer on the graphical user interface, wherein the event management viewer presents past user events that modified features of the viewing controller widget;

receiving, by one or more processors, a user selection of a previous event stored in the event log, wherein executing the user selection of the previous event provides a summary of a feature of the viewing controller widget, a hyperlink to help information regarding modifying the feature of the viewing controller widget, and an option to disable the feature of the viewing controller widget by using a single click, wherein the previous event stored in the event log previously modified the feature of the viewing controller widget, and wherein the previous event was generated as a result of user interface actions with the graphical user interface; and providing, by one or more processors, configuration options for a user selected event from the event log, wherein the configuration options are presented in the event management viewer as one or more previous events related to the viewing controller widget, wherein the one or more previous events modify one or more features of the viewing controller widget.

\* \* \* \* \*